US009140867B1

(12) United States Patent
Sandate Aguilar et al.

(10) Patent No.: US 9,140,867 B1
(45) Date of Patent: Sep. 22, 2015

(54) ARMORED OPTICAL FIBER CABLE

(71) Applicant: Corning Optical Communications LLC, Hickory, NC (US)

(72) Inventors: Mario Sergio Sandate Aguilar, Reynosa (MX); Michael John Gimblet, Conover, NC (US); Julian Latelle Greenwood, III, Hickory, NC (US); Warren Welborn McAlpine, Hickory, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

(21) Appl. No.: 14/315,872

(22) Filed: Jun. 26, 2014

Related U.S. Application Data

(60) Provisional application No. 61/864,104, filed on Aug. 9, 2013.

(51) Int. Cl.
*G02B 6/44* (2006.01)
(52) U.S. Cl.
CPC ............. *G02B 6/441* (2013.01); *G02B 6/4413* (2013.01)
(58) Field of Classification Search
None
See application file for complete search history.

(56) References Cited

U.S. PATENT DOCUMENTS

| 4,241,979 | A | * | 12/1980 | Gagen et al. | 385/107 |
|---|---|---|---|---|---|
| 4,496,214 | A | | 1/1985 | Oestreich et al. | 350/96.23 |
| 4,515,435 | A | | 5/1985 | Anderson | 350/96.23 |
| 4,535,098 | A | | 8/1985 | Evani et al. | 521/149 |
| 4,730,894 | A | | 3/1988 | Arroyo | 350/96.23 |
| 4,767,184 | A | | 8/1988 | Ogasawara et al. | 350/96.23 |
| 4,796,970 | A | | 1/1989 | Reeve et al. | 385/109 |
| 4,930,860 | A | | 6/1990 | Tansey et al. | 350/96.23 |
| 4,973,611 | A | | 11/1990 | Puder | 522/42 |
| 4,993,804 | A | | 2/1991 | Mayr et al. | 350/96.23 |
| 5,039,197 | A | * | 8/1991 | Rawlyk | 385/102 |
| 5,155,789 | A | | 10/1992 | Le Noane et al. | 385/106 |
| 5,157,752 | A | | 10/1992 | Greveling et al. | 385/112 |
| 5,173,961 | A | | 12/1992 | Chiasson | 385/113 |

(Continued)

FOREIGN PATENT DOCUMENTS

| CN | 102023357 B | 11/2012 | G02B 6/44 |
|---|---|---|---|
| EP | 1255144 A2 | 11/2002 | |

(Continued)

OTHER PUBLICATIONS

Hogari et al., Feb. 1998, "Optical Fiber Cables for Residential and Business Premises," *Journal of Lightwave Technology*, vol. 16, No. 2, pp. 207-213.

(Continued)

*Primary Examiner* — Mike Stahl
(74) *Attorney, Agent, or Firm* — William D. Doyle

(57) ABSTRACT

An optical communication cable includes a core, armor surrounding the core, a jacket surrounding and bonded to the armor, and a binder film also surrounding the core and interior to the armor. The core includes buffer tubes surrounding sets of optical fibers and a central strength member. The buffer tubes are stranded around the central strength member in a pattern of stranding including reversals in lay direction of the buffer tubes and the binder film holds the buffer tubes in position. The binder film is bonded to an interior of the armor, thereby providing a quick access capability to access the core via simultaneous removal of the binder film when the armor and jacket are removed.

21 Claims, 6 Drawing Sheets

(56) References Cited

U.S. PATENT DOCUMENTS

| | | | |
|---|---|---|---|
| 5,179,611 A | 1/1993 | Umeda et al. | 385/110 |
| 5,233,678 A | 8/1993 | Katurashima et al. | 385/112 |
| 5,388,175 A | 2/1995 | Clarke | 385/100 |
| 5,440,660 A | 8/1995 | Dombrowski et al. | 385/102 |
| 5,621,841 A * | 4/1997 | Field | 385/113 |
| 5,671,312 A | 9/1997 | Jamet | 385/100 |
| 5,684,904 A | 11/1997 | Bringuier et al. | 385/109 |
| 5,689,601 A * | 11/1997 | Hager et al. | 385/100 |
| 5,703,983 A | 12/1997 | Beasley, Jr. | 385/104 |
| 6,137,936 A | 10/2000 | Fitz et al. | 385/113 |
| 6,185,352 B1 | 2/2001 | Hurley | 385/114 |
| 6,193,824 B1 | 2/2001 | Einsle et al. | 156/53 |
| 6,195,486 B1 | 2/2001 | Field et al. | |
| 6,215,931 B1 | 4/2001 | Risch et al. | 385/109 |
| 6,304,701 B1 | 10/2001 | Bringuier et al. | 385/106 |
| 6,318,061 B1 | 11/2001 | Schneider et al. | 57/7 |
| 6,334,015 B2 | 12/2001 | Jamet | 385/102 |
| 6,483,971 B2 | 11/2002 | Gaillard et al. | 385/113 |
| 6,487,346 B2 | 11/2002 | Nothofer | 385/109 |
| 6,546,712 B2 | 4/2003 | Moss et al. | 57/293 |
| 6,597,844 B1 | 7/2003 | Witt et al. | 385/109 |
| 6,603,908 B2 | 8/2003 | Dallas et al. | 385/109 |
| 6,639,152 B2 * | 10/2003 | Glew et al. | 174/113 C |
| 6,658,184 B2 | 12/2003 | Bourget et al. | 385/100 |
| 6,721,480 B1 | 4/2004 | Bocanegra et al. | 385/114 |
| 6,760,523 B2 | 7/2004 | Nechitailo | 385/112 |
| 6,798,958 B2 | 9/2004 | Bourget et al. | 385/100 |
| 6,856,748 B1 | 2/2005 | Elkins, II et al. | 385/135 |
| 6,870,995 B2 | 3/2005 | Johnson et al. | 385/112 |
| 6,901,191 B2 | 5/2005 | Hurley et al. | 385/109 |
| 6,912,347 B2 | 6/2005 | Rossi et al. | 385/112 |
| 6,931,190 B2 | 8/2005 | Ino et al. | 385/128 |
| 6,937,802 B2 | 8/2005 | Jamet et al. | 385/106 |
| 6,957,000 B2 | 10/2005 | McAlpine et al. | 385/102 |
| 6,973,246 B2 | 12/2005 | Bocanegra et al. | 385/113 |
| 7,082,241 B2 | 7/2006 | Jamet et al. | 385/109 |
| 7,123,801 B2 | 10/2006 | Fitz | 385/105 |
| 7,200,307 B2 | 4/2007 | Bau' et al. | 385/111 |
| 7,212,715 B2 | 5/2007 | Dallas et | 385/100 |
| 7,242,830 B2 | 7/2007 | Storaasli et al. | 385/100 |
| 7,242,831 B2 | 7/2007 | Fee | 385/103 |
| 7,321,709 B2 | 1/2008 | Yokokawa et al. | 385/103 |
| 7,359,600 B2 | 4/2008 | Kim et al. | 385/113 |
| 7,373,057 B2 | 5/2008 | Pizzorno et al. | 385/109 |
| 7,391,943 B2 | 6/2008 | Blazer et al. | 385/109 |
| 7,431,963 B2 | 10/2008 | Konstadinidis et al. | 427/163.2 |
| 7,567,741 B2 | 7/2009 | Abernathy et al. | 385/113 |
| 7,570,852 B2 | 8/2009 | Nothofer et al. | 385/100 |
| 7,570,854 B2 | 8/2009 | Keller et al. | 385/110 |
| 7,630,605 B2 | 12/2009 | Bringuier et al. | 385/100 |
| 7,742,667 B2 | 6/2010 | Paschal et al. | 385/109 |
| 7,750,060 B2 | 7/2010 | Zahora et al. | 522/97 |
| 7,755,027 B2 * | 7/2010 | Browning et al. | 250/227.14 |
| 7,970,247 B2 | 6/2011 | Barker | 385/100 |
| 7,974,507 B2 | 7/2011 | Lovie et al. | 385/113 |
| 7,995,886 B2 | 8/2011 | Pizzorno et al. | 385/109 |
| 8,031,997 B2 | 10/2011 | Overton | 385/110 |
| 8,041,167 B2 | 10/2011 | Overton | 385/109 |
| 8,118,282 B2 | 2/2012 | Griffioen et al. | 254/134.4 |
| 8,165,439 B2 | 4/2012 | Overton | 385/106 |
| 8,175,434 B2 | 5/2012 | Davidson et al. | 385/113 |
| 8,180,190 B2 | 5/2012 | Bringuier et al. | 385/109 |
| 8,189,974 B2 | 5/2012 | Hashimoto et al. | 385/109 |
| 8,355,613 B2 | 1/2013 | Weimann | 385/100 |
| 8,467,645 B2 | 6/2013 | Keller et al. | 385/104 |
| 8,467,650 B2 | 6/2013 | Overton et al. | 385/128 |
| 8,494,327 B2 | 7/2013 | Keller et al. | 385/106 |
| 8,498,509 B2 | 7/2013 | Tatat | 385/109 |
| 2002/0041744 A1 * | 4/2002 | Anelli et al. | 385/112 |
| 2003/0035635 A1 | 2/2003 | Chastain et al. | 385/112 |
| 2003/0118295 A1 * | 6/2003 | Lail et al. | 385/101 |
| 2003/0123822 A1 | 7/2003 | Witt et al. | |
| 2003/0165310 A1 | 9/2003 | Moon et al. | 385/113 |
| 2004/0240806 A1 | 12/2004 | Lail et al. | 385/100 |
| 2004/0252954 A1 | 12/2004 | Ginocchio et al. | 385/100 |
| 2006/0045443 A1 | 3/2006 | Blazer | 385/114 |
| 2006/0093268 A1 | 5/2006 | Zimmel | 385/50 |
| 2008/0273845 A1 | 11/2008 | Weimann | 385/103 |
| 2009/0116797 A1 | 5/2009 | Stingl et al. | 385/103 |
| 2009/0214167 A1 | 8/2009 | Lookadoo et al. | 385/100 |
| 2009/0297104 A1 | 12/2009 | Kachmar | 385/101 |
| 2009/0317039 A1 | 12/2009 | Blazer et al. | 385/107 |
| 2010/0067856 A1 | 3/2010 | Knoch et al. | 385/111 |
| 2010/0119202 A1 | 5/2010 | Overton | 385/141 |
| 2010/0150505 A1 | 6/2010 | Testu et al. | 385/109 |
| 2010/0189399 A1 | 7/2010 | Sillard et al. | 385/126 |
| 2010/0202741 A1 | 8/2010 | Ryan et al. | 385/113 |
| 2011/0091171 A1 | 4/2011 | Tatat et al. | 385/105 |
| 2011/0110635 A1 | 5/2011 | Toge et al. | 385/102 |
| 2011/0135816 A1 | 6/2011 | Burns et al. | 427/163.2 |
| 2011/0194825 A1 | 8/2011 | Parris | 385/109 |
| 2011/0268398 A1 | 11/2011 | Quinn et al. | 385/100 |
| 2012/0063731 A1 | 3/2012 | Fitz et al. | 385/104 |
| 2012/0099825 A1 | 4/2012 | Messer | 385/113 |
| 2012/0257864 A1 | 10/2012 | Consonni et al. | 385/112 |
| 2012/0281953 A1 | 11/2012 | Choi et al. | 385/101 |
| 2013/0058614 A1 | 3/2013 | Gimblet et al. | 385/104 |
| 2013/0094821 A1 | 4/2013 | Logan | |
| 2014/0086543 A1 * | 3/2014 | Blazer et al. | 385/112 |
| 2015/0043874 A1 * | 2/2015 | Sandate Aguilar et al. | 385/100 |
| 2015/0110451 A1 * | 4/2015 | Blazer et al. | 385/103 |

FOREIGN PATENT DOCUMENTS

| | | | | |
|---|---|---|---|---|
| EP | 1531352 B1 | 12/2009 | | G02B 6/44 |
| EP | 1610163 B1 | 10/2011 | | G02B 6/44 |
| EP | 1982222 B1 | 6/2012 | | G02B 6/44 |
| GB | 2064163 A | 6/1981 | | G02B 5/14 |
| GB | 2096343 A | 10/1982 | | G02B 5/14 |
| GB | 2336000 A | 10/1999 | | |
| JP | 3137607 | 11/2007 | | A61B 6/00 |
| JP | 2010-39018 | 2/2010 | | G02B 6/44 |
| KR | 10-0288444 | 5/2001 | | G02B 6/44 |
| KR | 2001-0045604 | 6/2001 | | G02B 6/44 |
| KR | 10-1140219 B1 | 5/2012 | | G02B 6/44 |
| WO | WO 01/21706 A1 | 3/2001 | | C08L 23/06 |
| WO | WO 02/099491 A1 | 12/2002 | | G02B 6/44 |
| WO | WO 2006/034722 A1 | 4/2006 | | G02B 6/44 |
| WO | WO 2011/137236 A1 | 11/2011 | | B29C 47/02 |
| WO | 2012047440 A2 | 4/2012 | | |
| WO | WO 2012/071490 A2 | 5/2012 | | B29C 47/02 |
| WO | WO 2012/071490 A3 | 5/2012 | | B29C 47/02 |
| WO | WO 2013/130121 A1 | 9/2013 | | G02B 6/44 |
| WO | WO 2013/172878 A1 | 11/2013 | | G02B 6/44 |

OTHER PUBLICATIONS

Marelli et al., Nov. 11-14, 2007, "Indoor Cables for FTTH Applications, Allowing Quick and Simple Subscriber Connection," 56th IWCS Conference: Proceedings of the International Wire & Cable Symposium (IWCS), Inc., pp. 121-127.

Marik, J., "Advanced SZ Stranding Technology for Enhanced Applications," 4 pages, Last accessed on Feb. 21, 2014 from http://rosendahlaustria.com/custom/rosendahlaustria/Rosendahl_Products_PDF/1062003111324_p1_.pdf.

Nextrom, "SZ Stranding Line OFC 70," 2 pages, Last accessed on Feb. 21, 2014 from http://www.nextrom.com/877_en_SZ-Stranding-Line.aspx.

Prysmian Cables & Systems, Oct. 5, 2005, "Glossary Excerpt from Prysmian's Wire and Cable Engineering Guide," Revision 3, pp. 1-40, Retrieved from www.prysmian.com.

Rechberger, M., Hörschläger, W., "Buffering & SZ-Stranding Process for Compact Dry Tube FO-Cable," *Proceedings of the 56th Annual International Wire & Cable Symposium*, 2007, -pp. 614-617, Last accessed on Feb. 24, 2014 from http://ecadigitallibrary.com/pdf/IWCS07/15_5.pdf.

Patent Cooperation Treaty Annex to Form PCT/ISA/206, Communication Relating to the Results of the Partial International Search, Application No. PCT/US2013/061133, Jan. 8, 2014, 3 pages.

USPTO, Non-Final Rejection for U.S. Appl. No. 13/790,329, Mailing Date Aug. 16, 2013—12 pages.

(56) References Cited

OTHER PUBLICATIONS

Non-Final Rejection Response for U.S. Appl. No. 13/790,329, Mailing Date Oct. 2013—20 pages.
USPTO, Notice of Allowance for U.S. Appl. No. 13/790,329, Mailing Date Nov. 2013—8 pages.
U.S. Appl. No. 13/790,329, filed Mar. 8, 2013, Bradley J. Blazer, 48 pages.
U.S. Appl. No. 14/099,921, filed Dec. 7, 2013, Mario Sergio Sandate Aguilar, 35 pages.
U.S. Appl. No. 14/192,007, filed Feb. 27, 2014, Warren W. McAlpine, 18pages.
U.S. Appl. No. 14/231,875, filed Apr. 1, 2014, Michael Emmerich, 38 pages.
U.S. Appl. No. 61/892,534, filed Oct. 18, 2013, Bradley J. Blazer, 42 pages.
U.S. Appl. No. 14/136,311, filed Dec. 20, 2013, Anne G. Bringuier, 22 pages.
U.S. Appl. No. 61/921,769, filed Dec. 30, 2013, Anne G. Bringuier, 30 pages.
U.S. Appl. No. 61/921,777, filed Dec. 30, 2013, Warren W. McAlpine, 56 pages.
U.S. Appl. No. 61/921,755, filed Dec. 30, 2013, David Wesley Chiasson, 42 pages.
U.S. Appl. No. 61/921,763, filed Dec. 30, 2013, William Carl Hurley, 45 pages.
Patent Cooperation Treaty, International Search Report, PCT/US2014/049522, Mail date Feb 9, 2015, 11 pages.

\* cited by examiner

ARMORED OPTICAL FIBER CABLE

RELATED APPLICATIONS

This application claims the benefit of priority under 35 U.S.C. §119 of U.S. Provisional Application Ser. No. 61/864,104, filed on Aug. 9, 2013, the content of which is relied upon and incorporated herein by reference in its entirety.

BACKGROUND

The disclosure relates generally to optical communication cables and more particularly to optical communication cables including one or more features configured to protect the cable body from interaction with components located within the cable jacket. Optical communication cables have seen increased use in a wide variety of electronics and telecommunications fields. Optical communication cables may contain or surround one or more optical communication fibers. The cable provides structure and protection for the optical fibers within the cable.

SUMMARY

One embodiment of the disclosure relates to an optical communication cable that includes a core, armor surrounding the core, a jacket surrounding and bonded to the armor, and a binder film also surrounding the core and interior to the armor. The core includes buffer tubes surrounding sets of optical fibers and a central strength member. The buffer tubes are stranded around the central strength member in a pattern of stranding including reversals in lay direction of the buffer tubes and the binder film holds the buffer tubes in position. The binder film is bonded to an interior of the armor, thereby providing a quick access capability to access the core via simultaneous removal of the binder film when the armor and jacket are removed.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Figure 1:
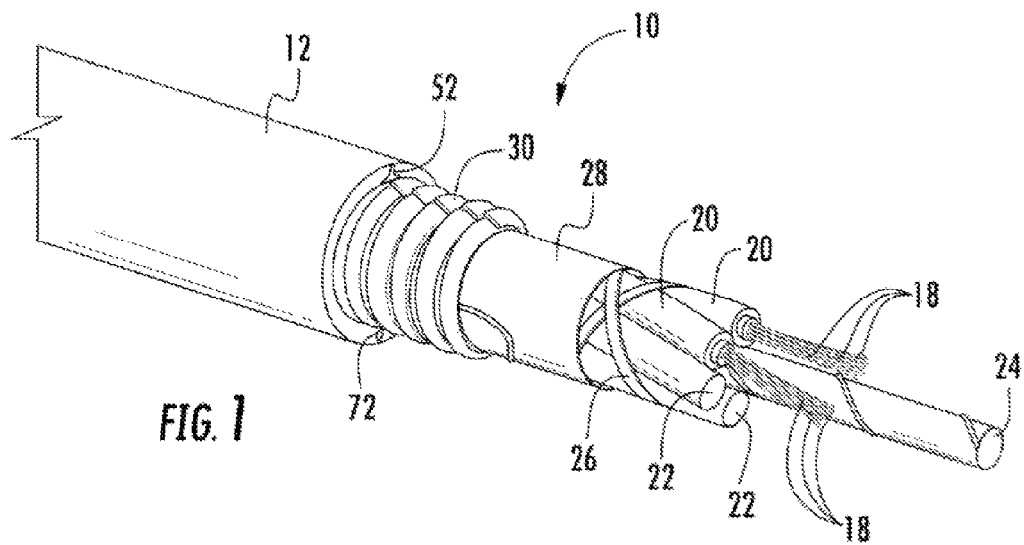
FIG. 1 is a perspective view of a fiber optic cable according to an exemplary embodiment.

Referring generally to the figures, various embodiments of an optical communication cable (e.g., a fiber optic cable, an optical fiber cable, etc.) are shown. In general, the cable embodiments disclosed herein include a cable jacket or body typically formed from a polymer material (e.g., a medium density polyethylene material). A group of optical fibers is surrounded by a protective, armor or reinforcement material (e.g., a corrugated metal sheet or sheets of material), and the armored group of optical fibers is positioned in a central channel of the cable jacket. Generally, the cable jacket provides physical support and protection to the optical fibers within the cable, and the armor material provides additional reinforcement to the optical fibers within the cable jacket.

The sheet or sheets of armor material includes an overlapped portion created by the overlapping of opposing edges of the armor material as the armor extends around the optical fibers. The overlapped section and, in particular, the exposed lateral edge of the upper portion of the overlap may contact the inner surface of the cable jacket that defines the channel of the cable jacket. This interaction or contact may tend to create a split within the cable jacket particularly upon twisting of the cable (such splitting may be referred to in the field as "cable zippering").

The cable jacket embodiments discussed herein include at least one protective member or feature positioned within the wall of the cable jacket that resists or prevents splitting caused by the armor overlap from compromising the integrity of the cable jacket. The protective member is positioned adjacent to and, in some embodiments, is in contact with the overlap of the armor material and/or the exposed lateral edge of the armor. The protective member may act to resist, limit or prevent split formation or split propagation that may otherwise be caused by the contact between the armor overlap and the material of the cable jacket.

In some embodiments, the material of the protective member may be more rigid than the primary material of the cable jacket. In such embodiments, the discontinuity at the interface of the two different materials may stop split propagation from continuing through to the outer surface of the cable jacket. In some other embodiments, the material of the protective member may be a compliant material that is less rigid than the primary material of the cable jacket. In such embodiments, the protective member may function as a compliant buffer that absorbs movement of the armor overlap rather than allowing a split to form in the primary material of the cable jacket.

In various embodiments discussed herein, the protective member may be formed along with the cable jacket in a single production step. For example, the protective member may be coextruded with the extruded material of the cable jacket. In such embodiments, the embedded protective member embodiments discussed herein may avoid the need for additional manufacturing steps to cover up or otherwise blunt the armor overlap.

Figure 2:
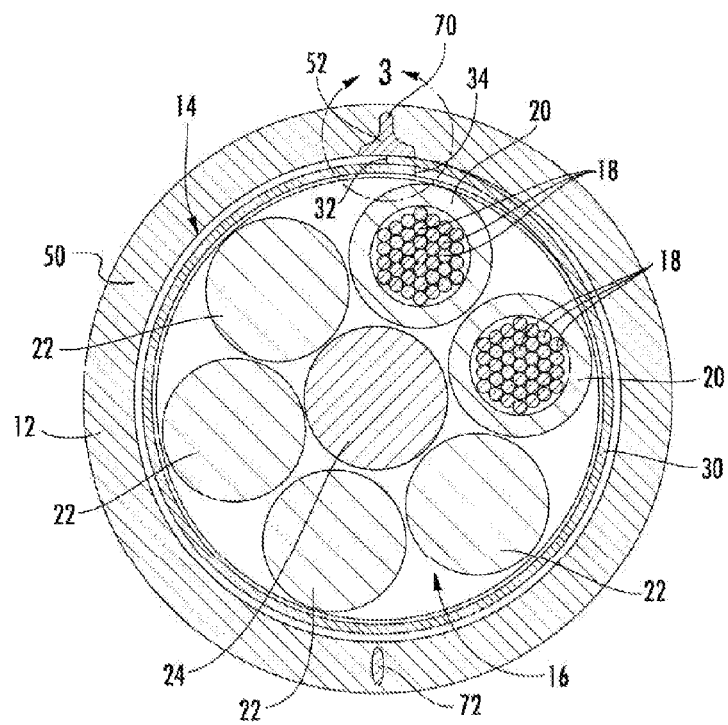
FIG. 2 is a cross-sectional view of the fiber optic cable of FIG. 1 according to an exemplary embodiment.

Referring to FIGS. 1 and 2, an optical communication cable, shown as cable 10, is shown according to an exemplary embodiment. Cable 10 includes a cable jacket, shown as cable jacket 12, having an inner surface 14 that defines a channel, shown as central bore 16. A plurality of optical transmission elements, shown as optical fibers 18, are located within bore 16. Generally, cable 10 provides structure and protection to optical fibers 18 during and after installation (e.g., protection during handling, protection from the elements, protection from vermin, etc.).

In the embodiment shown in FIGS. 1 and 2, bundles of optical fibers 18 are located within buffer tubes 20. One or more filler rods 22 are also located within bore 16. Filler rods 22 and buffer tubes 20 are arranged around a central support rod 24 formed from a material such as glass-reinforced plastic or metal. In some embodiments, helically wound binders 26 are wrapped around buffer tubes 20 and filler rods 22 to hold these elements in position around support rod 24. A barrier material, such as water barrier 28, is located around the wrapped buffer tubes 20 and filler rods 22. In other embodiments, a thin-film binder may be used, which may additionally be a water barrier.

An armor layer 30, is located outside of water barrier 28 or thin-film binder. Armor layer 30 extends around the interior elements (including optical fibers 18) of cable 10 such that armor layer 30 surround optical fibers 18. Armor layer 30 generally extends all or substantially all of the axial length of cable 10. Armor layer 30 generally provides an additional layer of protection to fibers 18 within cable 10, and may provide resistance against damage (e.g., damage caused by contact or compression during installation, damage from the elements, damage from rodents, etc.)

Figure 3:
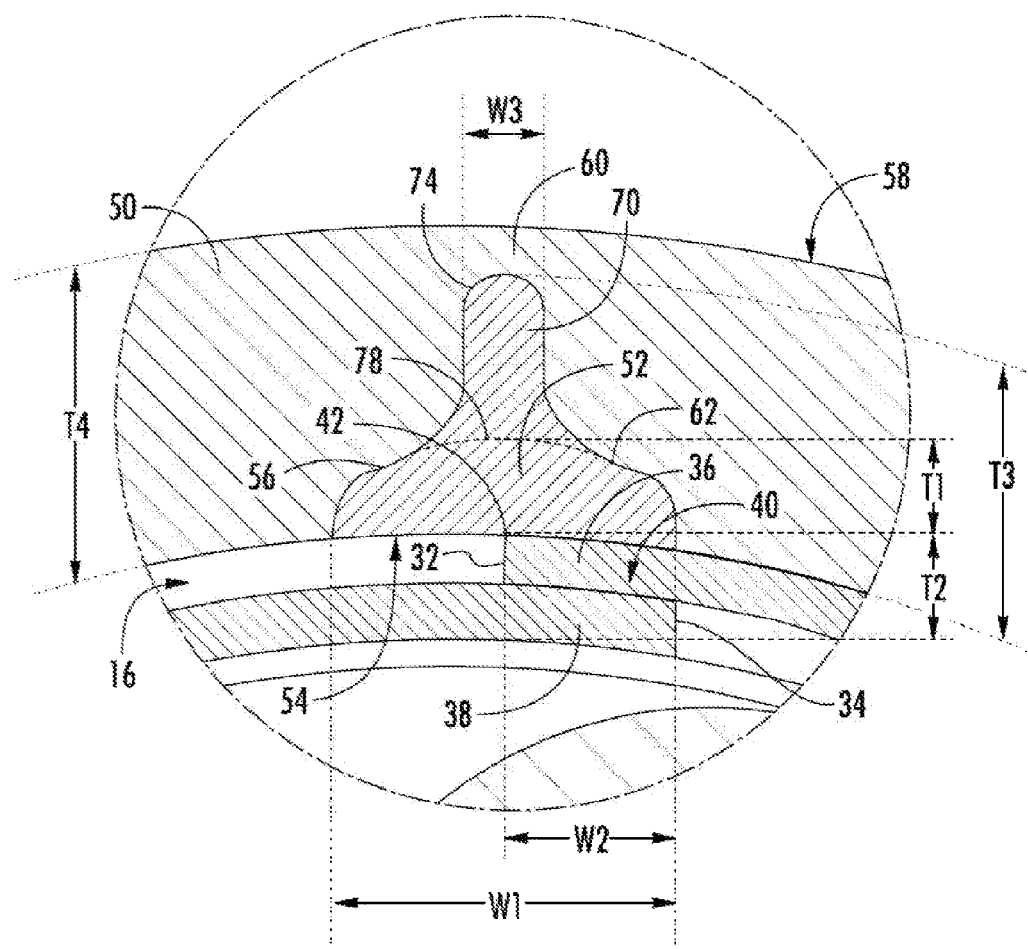
FIG. 3 is a detailed cross-sectional view of a portion of the fiber optic cable of FIG. 1 according to an exemplary embodiment.

As shown best in FIGS. 2 and 3, armor layer 30 has a first lateral edge 32 and a second lateral edge 34. In the embodiment shown, lateral edges 32 and 34 are substantially parallel to the longitudinal axis of cable 10 and of fibers 18. Referring to FIGS. 2 and 3, armor layer 30 is positioned such that first lateral edge 32 passes over or overlaps second lateral edge 34. In this arrangement, a section 36 of armor layer 30 adjacent first lateral edge 32 is located above a section 38 of armor layer 30 adjacent second lateral edge 34 forming an overlap portion 40. In one embodiment, an upper surface of section 38 is in contact with a lower surface of section 36 such that the thickness, T2 (i.e., the dimension in the radial direction shown in FIGS. 2 and 3) of overlap portion 40 is about twice the thickness the material of armor layer 30. With section 38 located below section 36, the upper corner 42 of lateral edge 32 defines the outer most corner of armor layer 30.

In various embodiments, armor layer 30 may be formed from a variety of strengthening or damage resistant materials. In the embodiment shown in FIG. 1, armor layer 30 is formed from a corrugated sheet of metal material having an alternating series of ridges and troughs. The corrugations may be oriented so that ridges formed thereby are directed away from the lengthwise axis of the cable. Further the sheets may be corrugated in a coordinated manner such that overlaying portions of the sheets have intermeshing features of the corrugations, thereby providing flexibility to the sheets in bending (via the corrugations in general) and coupling the sheets to one another via the intermeshing. In one embodiment, the corrugated metal is steel. In other embodiments, the corrugated metal may additionally serve as a ground conductor for the cable, such as with copper or aluminum armor. In other embodiments, other non-metallic strengthening materials may be used. For example, armor layer 30 may be formed from a fiberglass yarns (e.g., coated fiberglass yarns, rovings, etc.). In some embodiments, armor layer 30 may be formed from plastic materials having a modulus of elasticity over 2 GPa, and more specifically over 2.7 GPa. Such plastic armor layers may be used to resist animal gnawing and may include animal/pest repellant materials (e.g., a bitter material, a pepper material, synthetic tiger urine, etc.). In one embodiment, cable 10 could include a nylon 12 layer acting to resist termites.

Referring to FIGS. 2 and 3, cable jacket 12 generally includes a primary jacket portion 50 and a secondary jacket portion, shown as split resistant feature 52. Feature 52 is an elongate member or structure embedded within the material of primary jacket portion 50 of cable jacket 12. In various embodiments, feature 52 is a contiguous member that extends the length of cable jacket 12 between the first and second ends of the cable. In general, primary jacket portion 50 is made from a first material, and feature 52 is made from a second material that is different from the first material. Feature 52 includes an inner surface 54, and feature 52 is positioned such that inner surface 54 may be contiguous with inner surface 14 of cable jacket 12 such that inner surface 54 and inner surface 14 define channel 16. In one embodiment, feature 52 is coextruded along with primary jacket portion 50 such that the transition between inner surface 54 and inner surface 14 is a substantially smooth transition.

Feature 52 is positioned within primary jacket portion 50 such that inner surface 54 is aligned with and is generally adjacent to overlap portion 40, first lateral edge 32 and corner 42. Feature 52 is aligned with overlap portion 40, first lateral edge 32 and corner 42 such that inner surface 54 is located between overlap portion 40 and exterior surface 58 of cable jacket 12. In the embodiment shown in FIG. 3, inner surface 54 of feature 52 is located exterior to (i.e., above in the orientation of FIG. 3) overlap portion 40, first lateral edge 32 and corner 42. In a specific embodiment, inner surface 54 of feature 52 is in contact with the outer surface of overlap portion 40 and/or corner 42 of first lateral edge 32. In another embodiment, a layer of the material of jacket portion may be located between inner surface 54 of feature 52 and the outer surface of overlap portion 40 and corner 42 of first lateral edge 32. In such embodiments, even though inner surface 54 cannot directly contact overlap portion 40 because of the intervening material layer, such as when the feature 52 is fully embedded (i.e., completely surrounded when viewed in cross-section) in the primary jacket portion 50, inner surface 54 may be located a small distance (e.g., less than 1 mm or less than 0.5 mm) from the outer surface of overlap portion 40 and corner 42 of first lateral edge 32 such that split formation or propagation is resisted (see, e.g., FIG. 3).

Feature 52 acts to resist or prevent split formation or propagation within the material primary jacket portion 50 of cable jacket 12. In various embodiments, the material of primary jacket portion 50 may be susceptible to split formation if portions of armor overlap 40 contact the material of primary jacket portion 50. Such contact may occur during movements such as twisting movements typical during cable installation. However, in the embodiments discussed herein, feature 52 is sized, shaped, positioned and/or has certain material properties that allow feature 52 to prevent/limit/resist split formation or propagation. Thus, by positioning feature 52 as shown in FIG. 3, adjacent to overlap portion 40, feature 52 is able to interact with overlap 40 during movement of cable 10 and to resist split formation/propagation.

In a various embodiments, the width, W1, (i.e., the circumferential dimension in the circular embodiment of FIG. 2) of inner surface 54 of feature 52 is sized relative to the width, W2, of overlap 40 such that feature 52 remains aligned with overlap 40 even if rotation of armor layer 30 relative to cable jacket 12 occurs during jacket extrusion. In such embodiments, the width, W1, of inner surface 54 of feature 52 is greater than the width, W2, of overlap 40. In various embodiments, W1 is between 1 mm and 20 mm and specifically between 3 mm and 10 mm, and W2 is between 2 mm and 10 mm and specifically is between 3 mm and 5 mm. In round cables, the width W1 covers an arc length of at least 2° and/or less than 20°, such as at least 3° and/or less than 15°, about the center of the cable.

Feature 52 is positioned such that feature 52 does not extend all of the way through primary jacket portion 50 from channel 16 to outer surface 58 of cable 10. Thus, the thickness, T1, of feature 52 (i.e., the radial dimension of feature 52 in the circular embodiment of FIG. 2) is less than the thickness, T4, of primary jacket portion 50. In this embodiment, feature 52 extends from channel 16 outward a portion of the distance to outer surface 58 such that a section 60 of primary jacket portion 50 is located between an outermost surface 62 of feature 52 and outer cable surface 58.

In various embodiments, the material of feature 52 may be selected relative to the material of primary jacket portion 50 to resist/prevent split formation or propagation. In one embodiment, the modulus of elasticity of feature 52 may be greater than the modulus of elasticity of the material of primary jacket portion 50. In this embodiment, feature 52 may be formed from a material with relatively low bond strength to the material of primary jacket portion 50. In this embodiment, it is believed that the low bonding at interface 56 between feature 52 and primary jacket portion 50 will stop the propagation of a split that may be created within the material of feature 52 via interaction with overlap 40. By stopping split propagation at interface 56, a spilt is not permitted to extend through to outer surface 58 of cable jacket 12, and thus the feature 52 acts to maintain the wall of cable jacket 12 intact.

In such embodiments, the modulus of elasticity of the material of feature 52 is between 1.0 GPa and 2.0 GPa, specifically between 1.0 GPa and 1.5 GPa, and more specifically is about 1.2 GPa. In such embodiments, the modulus of elasticity of the material of primary jacket portion 50 is between 100 MPa and 800 MPa, specifically between 0.2 GPa and 0.4 GPa, and more specifically is about 0.31 GPa. In various embodiments, the modulus of elasticity of feature 52 is between 2 times and 10 times the modulus of primary jacket portion 50, specifically is between 3 times and 6 times the modulus of primary jacket portion 50, and more specifically is 4 times the modulus of primary jacket portion 50.

In various such embodiments, primary jacket portion 50 is formed from an extruded polymer material, and feature 52 is formed from an extruded polymer material. In a specific embodiment, primary jacket portion 50 is formed from (e.g., comprises, consists at least 50% of by volume, includes as the major constituent) an extruded medium density polyethylene material (e.g., a polyethylene material having a density between 0.939 to 0.951 g/cm$^3$), and feature 52 is formed from an extruded polypropylene material. In a specific embodiment, feature 52 is formed from an extruded polypropylene material that includes a low percentage of polyethylene. The small amount of polyethylene within feature 52 provides sufficient bonding with the material of primary jacket portion 50 allowing for proper coextrusion of feature 52 and primary jacket portion 50, while maintaining sufficient dissimilarity and low bonding to cease split propagation at interface 56. In various embodiments, the material of feature 52 may include between 2% and 20% polyethylene, specifically between 5% and 15% polyethylene and more specifically about 9% polyethylene. In such embodiments, these combinations of polyethylene and polypropylene for feature 52 may act to provide sufficient discontinuity at interface 56 to limit split propagation while providing sufficient bonding between the material of feature 52 and the surrounding material.

In some embodiments, the primary jacket portion 50 includes polyethylene, such as where polyethylene is the major constituent of the primary jacket portion 50, such as where the primary jacket portion 50 mostly consists of polyethylene by volume, such as greater than 50% polyethylene by volume, at least 70% polyethylene by volume, etc. In some such embodiments, the feature 52 is formed from a highly-plasticized polymer, such as a highly-plasticized polyvinyl chloride, polyurethane, polypropylene, or other highly-plasticized polymer. Softness and flexibility provided by the plasticizer may mitigate crack initiation and propagation therethrough. In other embodiments, the feature 52 is formed from a highly-filled polymer, such as a highly filled polyvinyl chloride, polyurethane, polypropylene, or other highly-filled polymer. Particles of the filler material and interfaces between the particles and the base material may arrest or limit crack propagation through the polymer.

In the embodiments of cable 10 in which the modulus of feature 52 is greater than the modulus of primary jacket portion 50, the thickness of feature 52 may be less than the thickness of overlap portion 40 because in these embodiments split propagation is limited by the discontinuity of material at interface 56. In such embodiments, the thickness, T1, (i.e., the radial dimension in the circular embodiment of FIG. 3) of feature 52 is between 0.1 mm and 0.5 mm. In such embodiments, thickness, T2, of overlap 40 is between 0.2 mm and 1.1 mm. In a specific embodiment, armor layer 30 is formed from a corrugated metal material and thickness, T2, is between 0.6 mm and 1.2 mm, and more specifically is between 0.78 mm and 1.04 mm. In another specific embodiment, armor layer 30 is formed from a non-corrugated metal material, and thickness, T2, is between 0.2 mm and 0.4 mm, and more specifically is between 0.28 mm and 0.34 mm.

In other embodiments, the modulus of elasticity of feature 52 may be less than the modulus of elasticity of the material of primary jacket portion 50. In this embodiment, feature 52 may be formed from a compliant material. In this embodiment, it is believed that the compliant material will resist or prevent split formation by deforming upon interaction with overlap portion 40 acting as a buffer to prevent displacement and resulting split formation within the more rigid material of primary jacket portion 50.

In such embodiments, the modulus of elasticity of the material of feature 52 is between 10 MPa and 50 MPa, specifically between 15 MPa and 25 MPa, and more specifically between 18 MPa and 19 MPa; and/or no more than half that of the material of primary jacket portion 50, such as no more than a third that of the material of primary jacket portion 50, such as no more than a quarter that of the material of primary jacket portion 50. In such embodiments, the modulus of elasticity of the material of primary jacket portion 50 is between 0.1 GPa and 0.8 GPa, specifically between 0.2 GPa and 0.4 GPa, and more specifically is about 0.31 GPa. In various embodiments, primary jacket portion 50 is formed from an extruded polymer material, and feature 52 is formed from an extruded polymer material. In a specific embodiment, primary jacket portion 50 is formed from an extruded medium density polyethylene material, and feature 52 is formed from an extruded thermoplastic elastomer material (TPE). In one embodiment, the TPE material may be Affinity GA 1950, available from the Dow Chemical Company.

In the embodiments of cable 10 in which the modulus of feature 52 is less than the modulus of primary jacket portion 50, the thickness of feature 52 may be equal to or greater than the thickness of overlap portion 40 because in some such embodiments split formation is resisted via compliance of feature 52, such as via stress isolation thereby. In such embodiments, the thickness, T1, (i.e., the radial dimension in the circular embodiment of FIG. 3) of feature 52 is between 0.5 mm and 1.1 mm. In such embodiments, thickness, T2, of overlap 40 is between 0.2 mm and 1.1 mm. In a specific embodiment, armor layer 30 is formed from a corrugated metal material and thickness, T2, is between 0.6 mm and 1.2 mm, and more specifically is between 0.78 mm and 1.04 mm. In another specific embodiment, armor layer 30 is formed from a non-corrugated metal material, and thickness, T2, is between 0.2 mm and 0.4 mm, and more specifically is between 0.28 mm and 0.34 mm.

In addition to providing split resistance via feature 52, cable jacket 12 may include a plurality of additional elongate members, shown as access features 70 and 72. In general access features 70 and 72 are elongate members or structures embedded within the material of primary jacket portion 50 of cable jacket 12. In various embodiments, access features 70 and 72 are contiguous members that extend the length of cable jacket 12 between the first and second ends of the cable.

In general, primary jacket portion 50 is made from a first material, and access features 70 and 72 are made from a second material that is different from the first material. The difference in materials provides a discontinuity or weakness within cable jacket 12 at the location of access features 70 and 72. These discontinuities provide an access point that allows a user of cable 10 to split cable jacket 12 when access to optical fibers 18 is desired. In various embodiments, access features 70 and 72 may be formed from a material (e.g., a polypropylene/polyethylene blend as discussed above) with low bonding relative to the material of primary jacket portion 50 that allows for jacket splitting by the user. In various embodiments, access features 70 and 72 and split resistant feature 52 may be formed (e.g., coextruded) as described in US 2013/0051743, filed Oct. 25, 2012, which is incorporated herein by reference in its entirety.

In various embodiments as shown in FIG. 2, access features 70 and 72 are formed from the same material as feature 52, and access feature 70 is contiguous with feature 52 such that access feature 70 and feature 52 form a single, continuous elongated member extending the length of cable 10. In this embodiment, access feature 70 and feature 52 may be extruded together in a single extrusion process. In this embodiment, outer surface 62 of feature 52 is continuous with outer surface 74 of access feature 70, and section 60 of primary jacket portion 50 is located above both outer surface 74 and outer surface 62. In various embodiments, the thickness, T3, of contiguous features 52 and 70 is the distance from inner surface 54 to the outer most point of surface 74, and the thickness, T4, of primary jacket portion 50 is the distance between the inner surface of primary jacket portion 50 and outer surface 58. In various embodiments, T3 is at least about 30% (such as at least a third) and/or no more than about 95% (such as less than all) of T4 (on average), such as between 50% and 95% of T4, specifically is between 70% and 90% of T4, and more specifically is between 80% and 90% of T4. In a specific embodiment, T3 is about 85% of T4.

In various embodiments, the thickness T4 of primary jacket portion 50 is between 0.5 mm and 5 mm, specifically between 1.0 mm and 2.0 mm, and more specifically is between 1.0 mm and 1.5 mm. In a specific embodiment, the thickness T4 of primary jacket portion 50 is about 1.3 mm. In such embodiments, the thickness T3 of contiguous features 52 and 70 is between 0.4 mm and 4.5 mm, specifically is between 1.0 mm and 1.8 mm and more specifically is between 1.1 mm and 1.5 mm. In a specific embodiment, the thickness T4 of primary jacket portion 50 is about 1.3 mm, and the thickness T3 of contiguous features 52 and 70 is about 1.1 mm.

In various embodiments, features 52, 70 and 72 may be formed from a polypropylene/polyethylene blended polymer material as discussed above, and in such embodiments, primary jacket portion 50 may be formed from a medium-density polyethylene material. In such an embodiment, the low bonding of the material of contiguous features 52 and 70 with the material of primary jacket portion 50 may function to limit split propagation past interface 56 as discussed above, and the low bonding of the material features 70 and 72 with the material of primary jacket portion 50 allows for splitting of jacket 12.

In other embodiments, access features 70 and 72 may be formed from a first material and feature 52 may be formed from a different second material. In one such embodiment, access features 70 and 72 may be formed from a material with low bonding relative to the material of primary jacket portion 50 that allows for jacket splitting by the user (e.g., a polypropylene/polyethylene blend as discussed above), and feature 52 may be formed from a compliant material such as a TPE material. In this embodiment, an interface 78 (shown by the dotted line in FIG. 3) may be present between split resistant feature 52 and access feature 70.

As shown in FIG. 3, the width W3 of access feature 70 (e.g., maximum tangential dimension) is less than width W1 of inner surface 54 of split resistant feature 52. In various embodiments, W3 is between 0.1 mm and 0.5 mm, specifically between 0.2 mm and 0.4 mm, and more specifically is about 0.3 mm. As discussed above, in various embodiments, W1 is between 1 mm and 20 mm and specifically between 3 mm and 10 mm, and W2 is between 2 mm and 10 mm and specifically is between 3 mm and 5 mm. In various embodiments W1 is between 5 times and 50 times greater than W3, and specifically is between about 10 times and 20 times greater than W3.

In the embodiment shown in FIG. 2, both access feature 70 and split resistant feature 52 are located generally at the 12 o'clock position, and access feature 72 is located approximately 180 degrees from feature 70 at the 6 o'clock position. Spacing access features 70 and 72 by 180 degrees may allow for maximized access to fibers 18 following jacket splitting.

Figure 4:
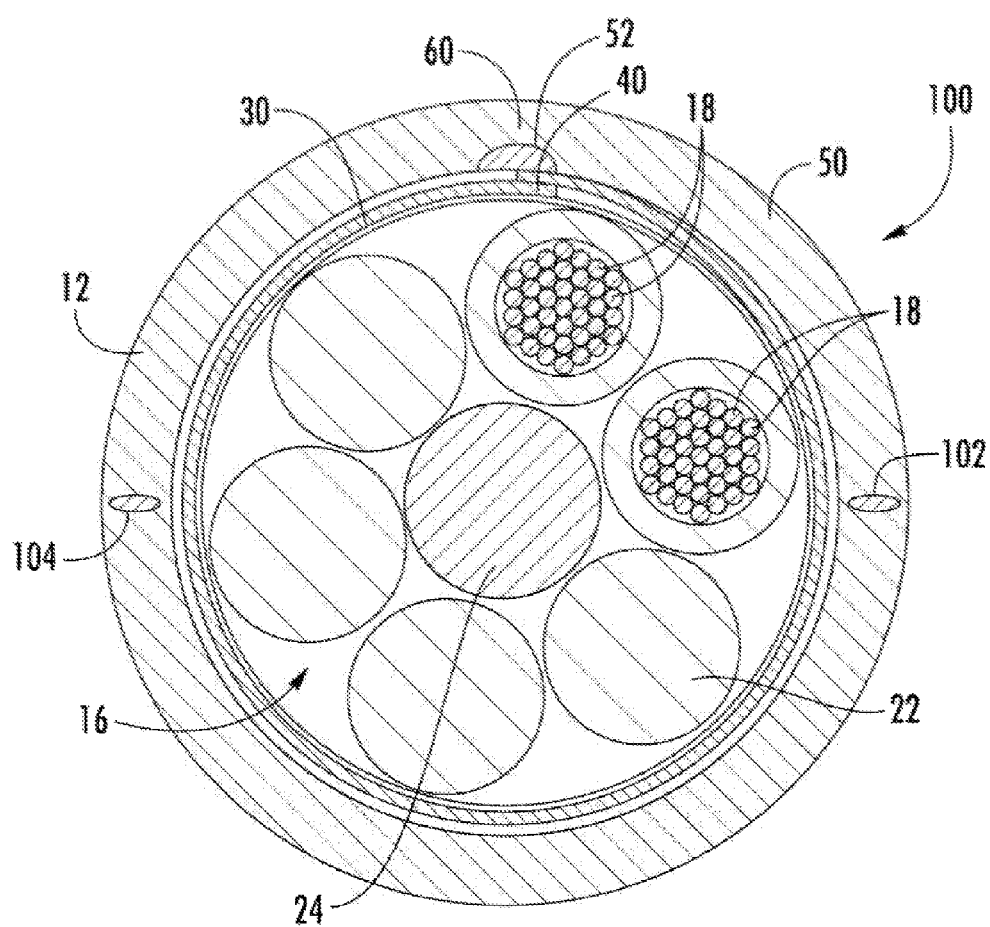
FIG. 4 is a cross-sectional view of a fiber optic cable according to another exemplary embodiment.

Referring to FIG. 4, a cable 100 is shown according to an exemplary embodiment. Cable 100 is substantially similar to cable 10 except as discussed herein. Cable 100 includes access features 102 and 104 embedded within the material of primary jacket portion 50. In this embodiment, access features 102 and 104 function same as features 70 and 72 discussed above except that they are spaced apart from feature 52. In the specific embodiment shown, feature 52 is located at the 12 o'clock position aligned with and adjacent armor overlap 40, access feature 102 is located approximately 90 degrees clockwise from feature 52 at the 3 o'clock position, and access feature 104 is located approximately 270 degrees clockwise from feature 52 at the 9 o'clock position.

Figure 5:
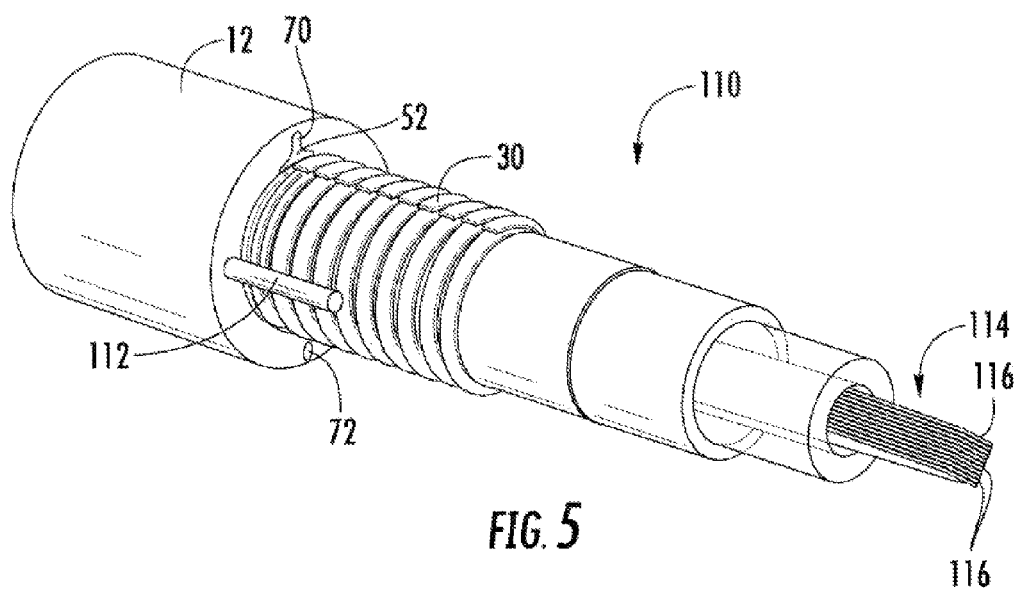
FIG. 5 is a perspective view of a fiber optic cable according to an exemplary embodiment.

Referring to FIG. 5, a cable 110 is shown according to an exemplary embodiment. Cable 110 includes split resistant feature 52 and access features 70 and 72 located within cable jacket 12 and is substantially similar to cable 10 except as discussed herein. Cable 110 includes an elongate strengthening member, shown as rod 112, located within cable jacket 12 that runs the length of cable jacket 12. Rod 112 is formed from a material that is more rigid than the material of cable jacket 12. In various embodiments, the strengthening member is metal, braided steel, glass reinforced plastic, fiber glass, fiber glass yarns or other suitable material. Cable 110 includes a stack 114 of a plurality of optical transmission elements, shown as fiber optic ribbons 116, located within the channel of cable jacket 12.

Figure 6:
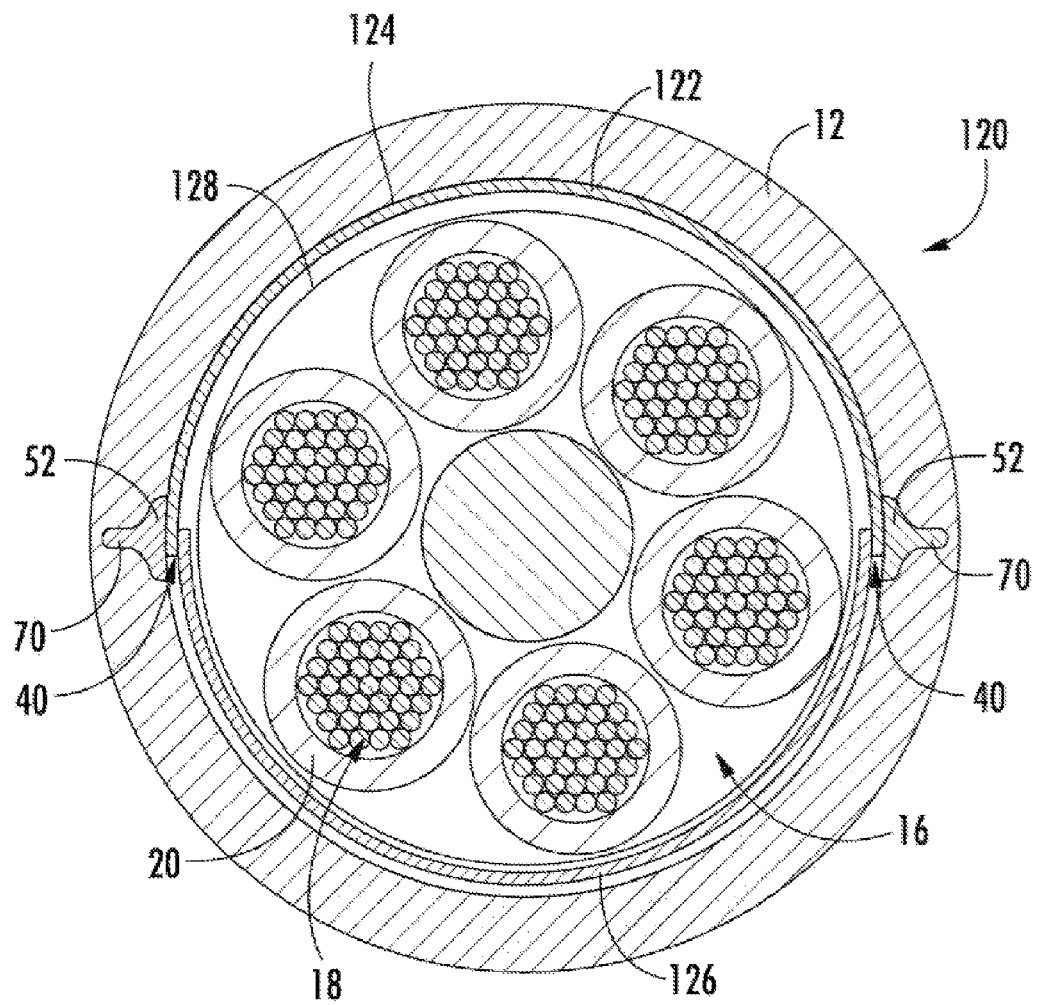
FIG. 6 is a cross-sectional view of a fiber optic cable according to another exemplary embodiment.

Referring to FIG. 6, a cable 120 is shown according to an exemplary embodiment. Cable 120 is substantially similar to cable 10 except as discussed herein. Cable 120 includes two split resistant features 52, and two access features 70 contiguous with each feature 52. In the embodiment shown, cable 120 includes a two-part armor layer 122 (e.g., clam shell armor layer) including two armor overlap portions 40. Split resistant features 52 and access features 70 are located adjacent to overlap portions 40. In this embodiment, armor layer 122 includes a first section 124 and a second section 126. In the embodiment shown, first section 124 and second section 126 are semi-cylindrical or arch-shaped elements with second section 126 received partially within first section 124 creating overlap portions 40. In other embodiments, the first section may be outside the second section on one side and vice versa on the other. Use of two split resistant features 52 may also facilitate tearing of a section of the jacket therebetween to assist accessing the contents of the cable 120.

In this embodiment, both of the access features 70 are positioned aligned with overlap sections 40. This positioning allows cable jacket 12 to be opened and for armor layer 122 to be opened (e.g., by separating first armor section 124 from second armor section 126) at the same time or with the same opening action that opens cable jacket 12.

In some such embodiments, a bonding agent (e.g., chemical bonding agent such as Maleic anhydride, ethylene acrylic acid copolymer; flame treatment changing the surface chemistry; surface roughening increasing the surface area) may be used in or adjoining cable jacket 12 to increase bonding between the inner surface of cable jacket 12 and the outer surface of armor layer 122, between either or both of the first and second sections 124, 125 and the jacket. The bonding between cable jacket 12 and armor layer 122 may facilitate removal of both layers together with a single opening action. The bonding agent may also act to prevent relative sliding of edges of two-piece armor layer 122, and the bonding agent may also be used to prevent relative sliding of the components of any of the other embodiments disclosed herein. The bonding agent may be mixed in the primary jacketing material, positioned on the surface of the armor, or both.

In one embodiment, cable 120 includes a binder layer, shown as thin-film binder 128, positioned around buffer tubes 20. Generally, thin-film binder 128 is a material layer surrounding and binding together buffer tubes 20 within central channel 16. In one embodiment, cable 120 and/or thin-film binder 128 may be binders/cables as disclosed in U.S. application Ser. No. 13/790,329, filed Mar. 8, 2013, which is incorporated herein by reference in its entirety. In some embodiments, the outer surface of binder 128 is bonded to the inside surface of armor layer 122 (e.g., with glue, bonding agent, chemical adhesion) so that the access features 70 may be used to tear open cable jacket 12, armor 122, and binder 128 in a single tearing action to access contents of cable 120 (e.g., buffer tubes 20 of optical fibers 18, a stack of fiber optic ribbons, tight-buffered fibers, or other arrangements of optical fibers). The binder film 128 may also serve as a carrier for water-blocking materials, such as SAP partially embedded on the inside surface of the film 128. The binder film 128 is substantially thinner than a jacket, such as less than a fifth of the jacket 12, less than a tenth, or even less than a twentieth. The binder film 128 may be extruded, and may include polyethylene, polypropylene, or another polymer as the primary constituent thereof. Tension in the binder film 128 may hold the contents of the core together as the binder film 128 cools and contracts following extrusion. In other embodiments, the binder film 128 is not bonded to the armor.

In the embodiments discussed above, primary jacket portion 50 is formed from a single layer of extruded polymer material (e.g., a medium-density polyethylene material), and in other embodiments, jacket 12 may include multiple layers of materials. In various embodiments, primary jacket portion 50 may be a variety of materials used in cable manufacturing such as polyvinyl chloride (PVC), polyvinylidene difluoride (PVDF), nylon, polyester or polycarbonate and their copolymers. In addition, the material of primary jacket portion 50 may include small quantities of other materials or fillers that provide different properties to the material of primary jacket portion 50. For example, the material of primary jacket portion 50 may include materials that provide for coloring, UV/light blocking (e.g., carbon black), burn resistance, etc.

Figure 7:
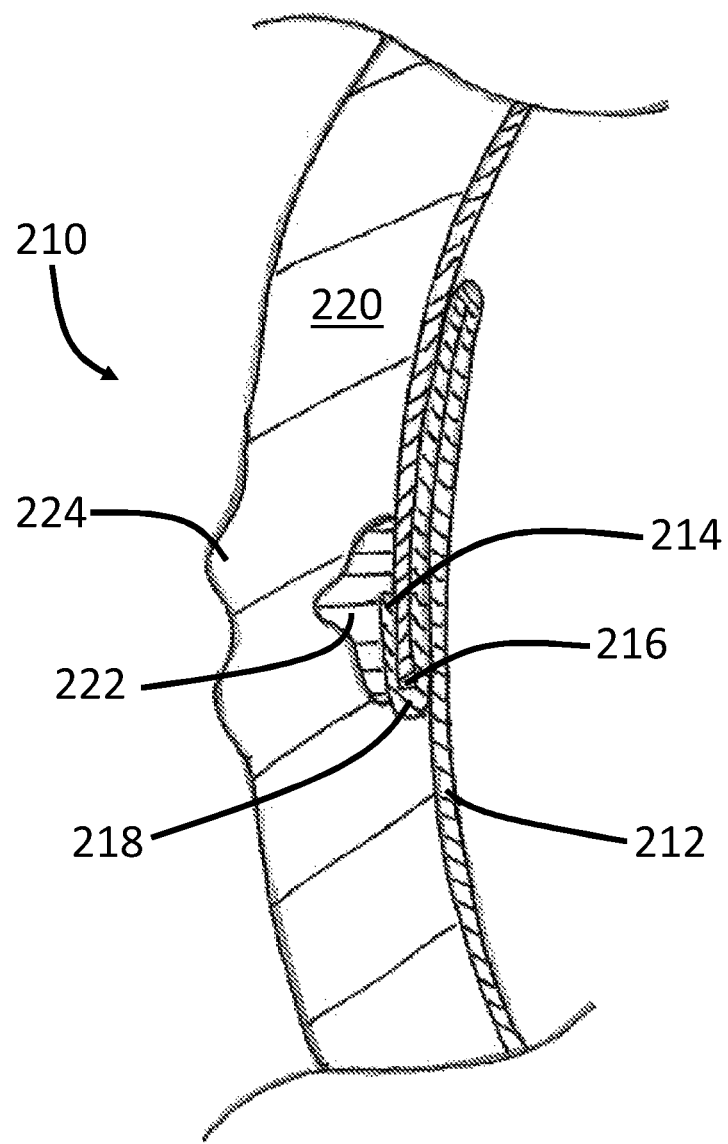
FIG. 7 is a cross-sectional view of an interface of armor according to another exemplary embodiment.

Referring now to FIG. 7, an interface 210 between lateral edges 214, 216 of armor 212 is shown. The lateral edges 214, 216 may be from the same armor sheet (see generally FIG. 2), or from separate armor sheets (see generally FIG. 6). According to an exemplary embodiment, the interface 210 includes a seat 218 in which one of the lateral edges 216 is held. A jacket 220 holds the lateral edge 216 in the seat 218 during operation of the corresponding cable. However, the seat 218 also allows the lateral edge 216 to be withdrawn from the seat 218 (vertically as shown in FIG. 7), such as with minimal resistance from the seat 218 itself (e.g., less than 15 N per meter length), such as if the jacket 220 is pulled apart from the inside, where the lateral edges are drawn apart in opposite directions tangential to the interface. Put another way, the seat 218 may lock the lateral edges 214, 216 together in some degrees of freedom, such as preventing relative rotations, relative radial translation (in the horizontal direction of FIG. 7), and relative lengthwise translation (limited via aligned corrugations between the overlaying pieces of armor 212, into and out of FIG. 7), but may allow relative tangential translation (i.e., pulling apart, in the vertical direction of FIG. 7).

In such an embodiment, the interface 210 may also be aligned with tear features and/or anti-zipper features 222 in the jacket 220, which mitigate the likelihood of inadvertent zippering and/or also may facilitate purposeful tearing open of the jacket 220. The net force to pull the jacket 220 and armor 212 apart may be less than 80 N to initiate a tear through the jacket 220 along the tear features and/or anti-zipper features 222 on a free end of the cable. As shown in FIG. 7, visual and/or tactile indicia on the exterior of the respective cable (e.g., either cable in FIGS. 2 and 6) may help users locate the interface 210. The indicia may include raised portions 224 of the jacket 220, such as bumps or elongate ridges on the jacket 220.

While the specific cable embodiments discussed herein and shown in the figures relate primarily to cables that have a substantially circular cross-sectional shape defining substantially cylindrical internal lumens, in other embodiments, the cables discussed herein may have any number of cross-section shapes. For example, in various embodiments, cable jacket 12 may have a square, rectangular, triangular or other polygonal cross-sectional shape. In such embodiments, the channel or bore of the cable may be the same shape or different shape than the shape of cable jacket 12. In some embodiments, cable jacket 12 may define more than one channel. In such embodiments, the multiple channels may be of the same size and shape as each other or each may have different sizes or shapes.

The optical fibers discussed herein may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber. In some contemplated embodiments, jackets and armor disclosed herein may be used with cables and conduits, such as ducts or conductive-copper carrying cable, where optical fibers may not be included.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

As noted above, cable 120 and/or thin-film binder 128 may be cables/binders as disclosed in U.S. application Ser. No. 13/790,329, filed Mar. 8, 2013, which is incorporated herein by reference in its entirety. In one embodiment, a fiber optic cable includes a core and a binder film. The core includes a central strength member and core elements, such as buffer tubes containing optical fibers, where the core elements are stranded around the central strength member in a pattern of stranding including reversals in lay direction of the core elements. The binder film is in radial tension around the core such that the binder film opposes outwardly transverse deflection of the core elements. Further, the binder film loads the core elements normally to the central strength member such that contact between the core elements and central strength member provides coupling therebetween, limiting axial migration of the core elements relative to the central strength member.

Cable 120 may be an outside-plant loose tube cable, an indoor cable with fire-resistant/retardant properties, an indoor/outdoor cable, or another type of cable, such as a datacenter interconnect cable with micro-modules or a hybrid fiber optic cable including conductive elements. According to an exemplary embodiment, the cable 120 includes a (e.g., sub-assembly, micro-module), which may be located in the center of the cable 120 or elsewhere and may be the only core of the cable 120 or one of several cores. According to an exemplary embodiment, the core of the cable 110 includes core elements. The core elements of cable 120 include a tube, such as a buffer tube 20 surrounding at least one optical fiber 18, a tight-buffer surrounding an optical fiber, or other tube. According to an exemplary embodiment, the tube 20 may contain two, four, six, twelve, twenty-four or other numbers of optical fibers 18. In contemplated embodiments, the core elements of cable 120 additionally or alternatively include a tube 20 in the form of a dielectric insulator surrounding a conductive wire or wires, such as for a hybrid cable.

In some embodiments, the tube 20 further includes a water-blocking element, such as gel (e.g., grease, petroleum-based gel) or an absorbent polymer (e.g., super-absorbent polymer particles or powder). In some such embodiments, the tube 20 includes yarn carrying (e.g., impregnated with) super-absorbent polymer, such as at least one water-blocking yarn, at least two such yarns, or at least four such yarns per tube 20. In other contemplated embodiments, the tube 20 includes super-absorbent polymer without a separate carrier, such as where the super-absorbent polymer is loose or attached to interior walls of the tube 20. In some such embodiments, particles of super-absorbent polymer are partially embedded in walls of the tube 20 (interior and/or exterior walls of the tube) or bonded thereto with an adhesive. For example, the particles of super-absorbent polymer may be pneumatically sprayed onto the tube 20 walls during extrusion of the tube 20 and embedded in the tube 20 while the tube 20 is tacky, such as from extrusion processes. According to an exemplary embodiment, the optical fiber 18 of the tube 20 is a glass optical fiber, having a fiber optic core surrounded by a cladding. Some such glass optical fibers may also include one or more polymeric coatings. The optical fiber 18 of the tube 20 is a single mode optical fiber in some embodiments, a multi-mode optical fiber in other embodiments, a multi-core optical fiber in still other embodiments. The optical fiber 18 may be bend resistant (e.g., bend insensitive optical fiber, such as CLEARCURVE™ optical fiber manufactured by Corning Incorporated of Corning, N.Y.). The optical fiber 18 may be color-coated and/or tight-buffered. The optical fiber 18 may be one of several optical fibers aligned and bound together in a fiber ribbon form.

According to an exemplary embodiment, the core of the cable 120 includes a plurality of additional core elements (e.g., elongate elements extending lengthwise through the cable 120), in addition to the tube 20, such as at least three additional core elements, at least five additional core elements. According to an exemplary embodiment, the plurality of additional core elements includes at least one of a filler rod and/or an additional tube 20'. In other contemplated embodiments, the core elements of cable 120 may also or alternatively include straight or stranded conductive wires (e.g., copper or aluminum wires) or other elements. In some embodiments, the core elements are all about the same size and cross-sectional shape (see FIG. 6), such as all being round and having diameters of within 10% of the diameter of the largest of the core element of cable 120. In other embodiments, core elements of cable 120 may vary in size and/or shape.

As noted above, the cable 120 includes a binder film 128 (e.g., membrane) surrounding the core of cable 120, exterior to some or all of the core elements of cable 120. The tubes 20 and any additional core elements are at least partially constrained (i.e., held in place) and directly or indirectly bound to one another by the binder film 128. In some embodiments, the binder film 128 directly contacts the core elements of cable 120. For example, tension in the binder film 128, for example circumferential tension, may hold the core elements against a central strength member 24 and/or one another. The loading of the binder film 128 may further increase interfacial loading (e.g., friction) between the core elements with respect to one another and other components of the cable 120, thereby constraining the core elements of cable 120. According to an exemplary embodiment, the binder film 128 includes (e.g., is formed from, is formed primarily from, has some amount of)

a polymeric material such as polyethylene (e.g., low-density polyethylene, medium density polyethylene, high-density polyethylene), polypropylene, polyurethane, or other polymers. In some embodiments, the binder film 128 includes at least 70% by weight polyethylene, and may further include stabilizers, nucleation initiators, fillers, fire-retardant additives, reinforcement elements (e.g., chopped fiberglass fibers), and/or combinations of some or all such additional components or other components.

According to an exemplary embodiment, the binder film 128 is formed from a material having a Young's modulus of 3 gigapascals (GPa) or less, thereby providing a relatively high elasticity or springiness to the binder film 128 so that the binder film 128 may conform to the shape of the core elements and not overly distort the core elements, thereby reducing the likelihood of attenuation of optical fibers 18 corresponding to the core elements. In other embodiments, the binder film 128 is formed from a material having a Young's modulus of 5 GPa or less, 2 GPa or less, or a different elasticity, which may not be relatively high. According to an exemplary embodiment, the binder film 128 is thin, such as 0.5 mm or less in thickness (e.g., about 20 mil or less in thickness, where "mil" is 1/1000th inch). In some such embodiments, the film 128 is 0.2 mm or less (e.g., about 8 mil or less), such as greater than 0.05 mm and/or less than 0.15 mm. In some embodiments, the binder film 128 is in a range of 0.4 to 6 mil in thickness, or another thickness. In contemplated embodiments, the film may be greater than 0.5 mm and/or less than 1.0 mm in thickness. In some cases, for example, the binder film 128 has roughly the thickness of a typical garbage bag. The thickness of the binder film 128 may be less than a tenth the maximum cross-sectional dimension of the cable, such as less than a twentieth, less than a fiftieth, less than a hundredth, while in other embodiments the binder film 128 may be otherwise sized relative to the cable cross-section. In some embodiments, when comparing average cross-sectional thicknesses, the jacket 12 is thicker than the binder film 128, such as at least twice as thick as the binder film 128, at least ten times as thick as the binder film 128, at least twenty times as thick as the binder film 128. In other contemplated embodiments, the jacket 12 may be thinner than the binder film 128, such as with a 0.4 mm nylon skin-layer jacket extruded over a 0.5 mm binder film.

The thickness of the binder film 128 may not be uniform around the bound stranded elements of cable 120. Applicants have found some migration of the material of the binder film 128 during manufacturing. For example, the belts (e.g., treads, tracks) of a caterpuller used to impart compressive forces on the binder film 128 that may somewhat flatten the binder film 128 on opposing sides thereof, as the binder film 128 solidifies and contracts to hold the stranded core elements to the central strength member 24. As such, the "thickness" of the binder film 128, as used herein, is an average thickness around the cross-sectional periphery. For example, the somewhat flattened portions of the binder film 128 caused by the caterpuller may be at least 20% thinner than the adjoining portions of the binder film 128 and/or the average thickness of the binder film 128.

Use of a relatively thin binder film 128 allows for rapid cooling (e.g., on the order of milliseconds) of the binder film 128 during manufacturing and thereby allowing the binder film 128 to quickly hold the core elements of cable 120 in place, such as in a particular stranding configuration, facilitating manufacturing. By contrast, cooling may be too slow to prevent movement of the stranded core elements when extruding a full or traditional jacket over the core, without binder yarns (or the binder film); or when even extruding a relatively thin film without use of a caterpuller (sometimes called a "caterpillar") or other assisting device. However such cables are contemplated to include technology disclosed herein (e.g., coextruded access features, embedded water-swellable powder, etc.) in some embodiments. Subsequent to the application of the binder film 128, the manufacturing process may further include applying a thicker jacket 12 to the exterior of the binder film 128, thereby improving robustness and/or weather-ability of the cable 120. In other contemplated embodiments, the core of cable 120, i.e., the portion surrounded by the binder film 128, may be used and/or sold as a finished product.

As shown in FIG. 1 and FIG. 6, the cable 120 further includes the central strength member 24, which may be a dielectric strength member, such as an up jacketed glass-reinforced composite rod. In other embodiments, the central strength member 24 may be or include a steel rod, stranded steel, tensile yarn or fibers (e.g., bundled aramid), or other strengthening materials. In one embodiment, the central strength member 24 includes a center rod and is up jacketed with a polymeric material (e.g., polyethylene, low-smoke zero-halogen polymer).

According to an exemplary embodiment, powder particles, such as super-absorbent polymer and/or another powder (e.g., talc), or another water-absorbing component (e.g., water-blocking tape, water-blocking yarns) are attached to the outer surface of the central strength member 24. At least some of the powder particles may be partially embedded in the up jacket of central strength member 24, and attached thereto by pneumatically spraying the particles against the up-jacket while the up jacket is in a tacky and/or softened state. The powder particles may increase or otherwise affect coupling between the central strength member 24 and the core elements of cable 120 around the central strength member 24.

Alternatively or in addition thereto, the particles may be attached to the up jacket of central strength member 24 with an adhesive. In some embodiments, the central strength member 24 includes the rod without an up-jacket, and the particles may be attached to the unjacketed rod. In contemplated embodiments, a strength member, such as a glass-reinforced rod or up jacketed steel rod, includes super-absorbent polymer or other particles attached to the outer surface thereof, as disclosed above, without the strength member being a central strength member.

In some embodiments, the core elements of cable 120 are stranded (i.e., wound) about the central strength member 24. The core elements of cable 120 may be stranded in a repeating reverse-oscillatory pattern, such as so-called S-Z stranding (see generally FIG. 1) or other stranding patterns (e.g., helical). The binder film 128 may constrain the core elements of cable 120 in the stranded configuration, facilitating mid-span or cable-end access of the optical fibers 18 and cable bending, without the core elements releasing tension by expanding outward from the access location or a bend in the core of the cable 120.

In other contemplated embodiments, the core elements of the cable 120 are non-stranded. In some such embodiments, the core elements of the cable 120 include micro-modules or tight-buffered optical fibers that are oriented generally in parallel with one another inside the binder film 128. For example, harness cables and/or interconnect cables may include a plurality of micro-modules, each including optical fibers and tensile yarn (e.g., aramid), where the micro-modules are bound together by the binder film 128. Some such cables may not include a central strength member. Some embodiments, include multiple cores or sub-assemblies, each bound by a binder film 128, and jacketed together in the same carrier/distribution cable, possibly bound together with another binder film. For some such embodiments, techniques disclosed herein for rapid cooling/solidification during extrusion and inducing radial tension in the binder film 128 for coupling to a central strength member 24 may be unnecessary for manufacturing.

In some embodiments, the binder film 128 of the cable 120 includes powder particles, which may be used for providing water blocking and/or for controlling coupling (e.g., decoupling) of adjoining surfaces in the cable 120. In some embodiments, the powder particles have an average maximum cross-sectional dimension of 500 micrometers (µm) or less, such as 250 µm or less, 100 µm or less. Accordingly, the particles may be larger than water-blocking particles that may be used inside the tubes 20, impregnated in yarns or embedded in interior walls of the tubes 20 as disclosed above, which may have an average maximum cross-sectional dimension less than 75 µm, to mitigate optical fiber micro-bend attenuation.

In some embodiments, at least some of the powder particles are coupled directly or indirectly to the binder film 128 (e.g., attached bound directly thereto, adhered thereto, in contact therewith), such as coupled to a surface of the binder film 128, coupled to an exterior surface of the binder film 128, coupled to an outside surface of the binder film 128 and/or an inside surface of the binder film 128. According to an exemplary embodiment, at least some of the powder particles are partially embedded in the binder film 128, such as passing partly through a surrounding surface plane of the binder film 128 while partially projecting away from the surface of the binder film 128; or, put another way, having a portion thereof submerged in the binder film 128 and another portion thereof exposed. In some embodiments, a rotating die may be used to increase normal force on the tubes.

The powder particles may be attached to the binder film 128 by pneumatically spraying the powder particles onto the binder film 128, into and outside of the associated extrusion cone formed during extrusion of binder film 128 The pneumatic spraying may also facilitate rapid cooling of the binder film 128. In other embodiment, static electricity or other means may be used to motivate the powder particles to embed in the binder film 128 or otherwise couple thereto. In other embodiments, glues or other attachment means are used to attach the powder particles to the binder film 128. Use of the binder film 128 as a carrier for super-absorbent polymer particles may remove need for water-blocking tape between the core and cable components outside the core, as well as remove need for binder yarn to hold the water-blocking tape in place. In still other embodiments, powder particles may be present but loose and/or not attached to the binder film 128. In contemplated embodiments, the binder film 128 may be coated with a continuous water-blocking material/layer, or may include other types of water-blocking elements or no water-blocking elements.

According to an exemplary embodiment, the powder particles include super-absorbent polymer particles, and the amount of super-absorbent polymer particles is less than 100 grams per square meter of surface area (g/m$^2$) of the respective component to which the powder particles are coupled (central strength member 24 or binder film 128). In some such embodiments, the amount of super-absorbent polymer particles is between 20 and 60 g/m$^2$, such as between 25 and 40 g/m$^2$. According to an exemplary embodiment, the amount of super-absorbent polymer or other water-blocking elements used in the cable is at least sufficient to block a one-meter pressure head of tap water in a one-meter length of the cable 120, according to industry standard water penetration tests, which may correspond to the above quantities, depending upon other characteristics of cable 120, such as interstitial spacing between core elements.

According to an exemplary embodiment, at least some of the powder particles are positioned on an inside surface of the binder film 128 between the binder film 128 and the core elements of cable 120. In addition to blocking water, such placement may mitigate adhesion between the binder film 128 and the core elements during manufacturing of the cable 120, such as if the binder film 128 is tacky from extrusion or other manufacturing approaches, such as laser welding or heat softening. Alternatively or in combination therewith, in some embodiments, at least some of the powder particles are positioned on an outside surface of the binder film 128.

Powder particles positioned on the outside surface of the binder film 128 may provide water blocking between the binder film 128 and components of the cable 120 exterior thereto, such as metal or dielectric armor 30 (FIG. 1) or micro-modules outside the core of cable 120. The armor 30, as shown in FIG. 1, may be corrugated steel or another metal and may also serve as a ground conductor, such as for hybrid fiber optic cables having features disclosed herein. Use of a film binder, instead of a thicker layer, allows a narrower "light armor" design, where there is no jacket between the armor 30 and the core of the cable. Alternatively, the armor 30 may be dielectric, such as formed from a tough polymer (e.g., some forms of polyvinyl chloride).

According to an exemplary embodiment, embedded material discontinuities, such as easy access features 70 in the jacket 12, such as narrow strips of co-extruded polypropylene embedded in a polyethylene jacket 12, may provide tear paths to facilitate opening the jacket 12. Alternatively, ripcords in or adjoining the jacket 12 may facilitate opening the jacket 12.

In some embodiments, the jacket 12 and binder film 128 may blend together during extrusion of the jacket 12 over the binder film 128, particularly if the jacket 12 and the binder film 128 are formed from the same material without powder particles therebetween. In other embodiments, the jacket 12 and the binder film 128 may remain separated or at least partially separated from one another such that each is visually distinguishable when the cable 120 is viewed in cross-section. In some embodiments, the binder film 128 and the jacket 12 are not colored the same as one another. For example, they may be colored with visually distinguishable colors, having a difference in "value" in the Munsell scale of at least 3. For example, the jacket 12 may be black while binder film 128 may be white or yellow, but both including (e.g., primarily consisting of, consisting of at least 70% by weight) polyethylene.

In some contemplated embodiments, the jacket 12 is opaque, such as colored black and/or including ultra-violet light blocking additives, such as carbon-black; but the binder film 128 is translucent and/or a "natural"-colored polymer, without added color, such that less than 95% of visible light is reflected or absorbed by the binder film 128. Accordingly, in at least some such embodiments, upon opening or peeling back the jacket 12 away from the binder film 128 and the core of cable 120, the tube 20 and at least some of the plurality of additional core elements are at least partially visible through the binder film 128 while being constrained thereby with the binder film 128 unopened and intact, such as visible upon directing light from a 25 watt white light-bulb with a 20-degree beam directly on the binder film 128 from a distance of one meter or less in an otherwise unlit room. In contemplated embodiments, the core includes a tape or string (e.g., polymeric ripcord), beneath the binder film 128 and visible through the binder film 128, which may include indicia as to contents of the core or a particular location along the length of the cable 120.

According to an exemplary embodiment, the binder film 128 is continuous peripherally around the core, forming a continuous closed loop (e.g., closed tube) when viewed from the cross-section, as shown in FIG. 6 for example, and is also continuous lengthwise along a length of the cable 120, where the length of the cable 120 is at least 10 meters (m), such as at least 100 m, at least 1000 m, and may be stored on a large spool. In other contemplated embodiments, the cable 120 is less than 10 m long.

In some embodiments, around the cross-sectional periphery of the binder film 128, the binder film 128 takes the shape of adjoining core elements and extends in generally straight paths over interstices between the core elements, which may, in some embodiments, result in a generally polygonal shape of the binder film 128 with rounded vertices, where the number of sides of the polygon corresponds to the number of adjoining core elements.

In some embodiments, the binder film 128 arcs into the interstices between core elements so that the binder film 128 does not extend tangentially between adjoining core elements, but instead undulates between concave arcs and convex arcs around the periphery of the stranded core elements and intermediate interstices. The concave arcs may not be perfect circular arcs, but instead may have an average radius of curvature that is greater than the radius of one or all of the stranded core elements and/or the central strength member 24. Put another way, the degree of concavity of the concave arcs is less than the degree of convexity of the convex arcs. Applicants theorize that the undulation between concave arcs and convex arcs constrains the stranded core elements, opposing unwinding of the stranded core elements about the central strength member 24. Applying a vacuum to the interior of the extrusion cone used to form binder file 128 may increase the draw-down rate of the extrudate, and may facilitate formation of the concave arcs. Applicants further believe that the undulation and concave arcs increase the torsional stiffness of the binder film 128.

Use of a continuous binder film 128 may block water from being able to reach the core of cable 120. In other embodiments, the binder film 128 includes pinholes or other openings. In some contemplated embodiments, binder films may be extruded in a criss-crossing net mesh pattern of film strips, or as a helical or counter-helical binder film strip(s), such as via rotating cross-heads or spinnerets. Either the core or the cross-head may be rotated, and the core may be rotated at a different rate than the cross-head, or vice versa. In other contemplated embodiments, a pre-formed curled or C-shaped tube may be used as the binder 128, where the core is bound thereby.

In some embodiments the binder film 128 is in tension around the core of cable 120, where hoop stress is spread relatively evenly around the transverse (i.e., cross-sectional) periphery of the binder film 128 where the binder film 128 overlays (e.g., contacts directly or indirectly) elements of the core of cable 120. As such, the binder film 128 opposes outwardly transverse deflection of the core elements relative to the rest of the cable 120, such as outward torsional spring force of S-Z stranded core elements, buckling deflection of un-stranded core elements, such as flat fiberglass yarns, or other loading. As such, the tension in the binder film 128 may improve cable stability and integrity, such as in compression of the cable 120. In one embodiment, the binder film 128 is able to cool and constrict to a degree that applies a load to the stranded core elements of cable 120 that compresses the core elements (e.g., buffer tube 20) against the central strength member 24, providing coupling therebetween.

In some embodiments, the tension of the binder film 128 has a distributed loading of at least 5 newtons (N) per meter (m) length of the cable 120, which may be measured by measuring the average diameter of an intact binder film 128 surrounding the core elements, then opening the binder film 128, removing the core elements, allowing time for the binder film 128 to contract to an unstressed state (e.g., at least a day, depending upon material) at constant temperature, then measuring the decrease in binder film 128 widthwise dimension (i.e., compared to the average periphery). The tension is the loading required to stretch the binder film 128 to the original width.

In various embodiments, thermoplastics and/or materials other than polyethylene may be used to form the binder film 128. The binder film 128 may be of various colors, and may have UV stabilizers that permit the binder film 128 as the exterior of a finished outdoor product. The binder film 128 may be printed upon. The binder film 128 may include tear or easy access features, such as those as disclosed herein with regard to the jacket 12. In some embodiments, the binder film 128 may surround a broad range of different types of stranded cable components, such as S-Z stranded tight-buffered fibers, filler rods, fiberglass yarns, aramid yarns, and other components. According to an exemplary embodiment, the cable 120 includes a dielectric armor layer, such as armor 30, beneath the jacket 12, between the jacket 12 and the core elements of cable 120.

According to an exemplary embodiment, the material of the binder film 128 may be selected such that the melting temperature of the material of the binder film 128 is less (e.g., at least 30° C. less, at least 50° C. less) than the extrusion temperature (e.g., about 200-230° C.±20° C.) of a jacket 12 that is subsequently extruded over the binder film 128. In some such embodiments, the binder film 128 melts or blends into the jacket 12. In other embodiments, the binder film 128 maintains separation from the jacket 12 by intermediate material, such as super-absorbent polymer particles. Applicants theorize that a reason the stranded core elements of cable 120 do not migrate axially or outwardly during extrusion of the jacket 12, while melting or softening of the binder film 128, is that, by the time of subsequent extrusion of the jacket 12 (e.g., at least 2 seconds following stranding and application of the binder film 128, at least 5 seconds, at least 10 minutes), the stranded core elements of cable 120 have sufficiently conformed to the geometry of the stranding pattern due to stress relaxation of the materials of the stranded core elements, reducing spring forces initially carried by the stranded elements upon stranding; and Applicants theorize that the jacket 12 positively contributes to radial tension applied by the binder film 128 to constrain and normally load the core elements to the central strength member 24.

Further, Applicants have found that application of the binder film 128 at extrusion temperatures above the melting temperature of the stranded core elements (e.g., at least 30° C. above, at least 50° C. above) does not melt or substantially deform the stranded elements. As such, the binder film 128 may include the same or similarly-melting polymers as buffer tubes 20, stranded in the core, such as polypropylene. Further, Applicants have found very little or no sticking between the binder film 128 and buffer tubes 20 stranded in the core of cable 120.

Further, Applicants have found that the greater strength of polypropylene relative to polyethylene allows the binder film 128 to be thinner for a polypropylene binder film 128 to provide the same amount of coupling force between the stranded core elements and the central strength member 24. For example, a 0.15 mm binder film 128 of polyethylene was found to have about a 70 N radial force, while a 0.15 mm binder film 128 of polypropylene had about an 85 N radial force. However, polyethylene is typically considerably less expensive than polypropylene, and in other embodiments, polyethylene may be used for the binder film 128.

In some embodiments, the binder film 128 is formed from a first material and the jacket 12 is formed from a second material. The second material of the jacket 12 may include, such as primarily include (>50% by weight), a first polymer such as polyethylene or polyvinyl chloride; and the first material of the binder film 128 may include, such as primarily include, a second polymer, such as polypropylene. In some embodiments, the first material further includes the first polymer (e.g., at least 2% by weight of the first material, at least 5% by weight, at least 10% by weight, and/or less than 50% by weight, such as less than 30% by weight). Inclusion of the first polymer in the first material of the binder film 128, in addition to primarily including the second polymer in the first material, may facilitate bonding between the first and second materials so that the binder film 128 may be coupled to the jacket 12 and automatically removed from the core of cable 120 when the jacket 12 is removed from the core, such as at a mid-span access location.

Using pull-through testing, Applicants have found that the binder film 128, as disclosed herein, results in a (net) static friction force between the stranded core elements of cable 120 and the central strength member 24 of at least 10 N for a 100 mm length of stranded elements, such as at least 15 N. Via pull-through testing, Applicants have found that the magnitude of the static friction force is related to the thickness of the binder film 128. For a polypropylene binder film 128 of at least 0.02 mm but less than 0.04 mm in average wall thickness, the static friction force for a 100 mm section of stranded core elements (without a jacket) is at least 10 N, such as about 12.4 N, and/or the average static friction force for a 200 mm section of stranded core elements is at least 20 N, such as about 23.1 N. Accordingly, for such a binder film 128, the reverse-oscillatory stranding pattern must be such that the net spring force of the stranded core elements is about 10 N or less for a 100 mm section to prevent axial migration of the stranded core elements and formation of a "bird nest" during manufacturing. Applicants have also found, for a polypropylene binder film 128 of at least 0.08 mm but less than 0.15 mm in average wall thickness, the average static friction force for a 100 mm section of stranded elements is at least 20 N, such at least 30 N, and/or the average static friction force for a 200 mm section of stranded elements is at least 40 N, such as at least 50 N. Some testing included stranded elements bound by both binder film 128 and binders yarns to determine the contribution of the binder film 128.

In some embodiments, a stranded core of a cable, such as cable 120, includes a binder film 128 that constrains the stranded core elements having a reversal. In some embodiments, the core may be enclosed within a jacket, such as jacket 12. Binder film 128 is a thin polymeric material (e.g. polypropylene, polyethylene), which can be torn and peeled back by hand to provide access to the stranded core elements and central strength member 24. Once released from the binder film 128, the stranded core elements may decouple from the central strength member 24.

In some embodiments, another advantage of the binder film 128 is that stranded core elements can be accessed by opening the binder film 128, but without severing and/or removing lengthwise tension in the binder film 128. For example, a lengthwise incision is formed in the binder film 128, which may be guided by an interstice (i.e., open space, gap, groove) between stranded core elements. Due to the thinness of the binder film 128, the incision can be made without specialize tools. For example, the incision in binder film 128 can be cut with scissors. A razor blade, key, pocket knife or other common tools may also work. The lengthwise incision in binder film 128 provides an opening through which the stranded core elements can be unwound at a reversal to provide extra length for handing the stranded elements, and one or more of the elements may be tapped at the mid-span location. For example, a buffer tube 20 may be cut and pulled out of the opening formed by the incision in binder film 128 so that optical fibers 18 can be accessed. At the same time, the rest of the binder film 128 holds together and maintains tension forward and rear of the incision along the length of the cable 120. Once access is no longer needed, the opening can be taped, shrink wrapped, or otherwise secured and resealed. By contrast, binder yarns may need to be fully severed to access the stranded elements, releasing tension in the binder yarns.

What is claimed is:

1. An optical communication cable, comprising:
(A) a core of the cable, comprising:
   (i) optical fibers each comprising a core surrounded by a cladding;
   (ii) buffer tubes surrounding subsets of the optical fibers,
   (iii) a central strength member, wherein the buffer tubes are stranded around the central strength member in a pattern of stranding including reversals in lay direction of the buffer tubes;
(B) armor surrounding the core of the cable, wherein the armor comprises metal;
(C) a jacket surrounding and bonded to the armor, wherein the jacket comprises a polymer;
(D) a binder film to hold the buffer tubes in position around the central strength member,
   wherein the binder film surrounds the core of the cable and is interior to the armor,
   wherein the binder film is bonded to an interior of the armor, thereby providing quick access to the core of the cable via simultaneous removal of the binder film when the armor and jacket are removed; and
(E) water-absorbing powder particles positioned on an interior surface of the binder film, between the binder film and the core of the cable.

2. The optical communication cable of claim 1, wherein the binder film comprises a polymer as the primary constituent thereof.

3. The optical communication cable of claim 2, wherein the polymer of the binder film is either polyethylene or polypropylene, and wherein the polymer of the jacket is polyethylene.

4. The optical communication cable of claim 2, wherein the binder film is continuous peripherally around the core elements, forming a continuous closed loop when viewed in cross-section, and continuous lengthwise along a length of the cable that is at least 10 meters.

5. The optical communication cable of claim 4, wherein, on average, the jacket is at least five times thicker than the binder film.

6. The optical communication cable of claim 1, wherein the binder film has an outer surface and the armor has an inside surface, and wherein the outer surface of the binder film is bonded to the inside surface of armor layer via at least one of a glue, a bonding agent, and chemical adhesion.

7. The optical communication cable of claim 1, wherein at least some of the powder particles are partially embedded in the binder film having a portion thereof submerged in the binder film and another portion thereof exposed.

8. The optical communication cable of claim 1, wherein the jacket is bonded to the armor, facilitated by a chemical bonding agent, and wherein the armor comprises a corrugated metal sheet having a lateral edge.

9. The optical communication cable of claim 8, wherein the jacket comprises:
(i) a main portion formed from a first material and including an inner surface and an outer surface; and
(ii) access features formed from a second material and embedded within the main portion, wherein one of the access features overlays the lateral edge of the armor.

10. An optical communication cable comprising:
a jacket formed from an extruded first material and including a inner surface defining a channel;
a plurality of optical transmission elements located within the channel;
a central strength member located within the channel, wherein the plurality of optical transmission elements are wrapped around the central strength member in a S-Z stranding pattern;
a binder film formed from an extruded second material and including an outer surface, wherein the binder film is continuous peripherally around the plurality of optical transmission elements to define a continuous closed loop when viewed in a cross-section perpendicular to a long axis of the cable, wherein the binder film is continuous lengthwise for at least 10 meters along a length of the cable, and wherein the binder film is formed from a polymer material having a Young's modulus of 3 gigapascals or less, wherein the binder film has a thickness of less than 0.5 mm; and
an armor layer located within the channel and surrounding the plurality of optical transmission elements and surrounding the binder film, wherein the outer surface of the binder film is bonded to an inner surface of the armor layer.

11. The optical communication cable of claim 10 wherein an outer surface of the armor layer is bonded to the inner surface of the jacket.

12. The optical communication cable of claim 11 wherein the binder film binds the plurality of optical transmission elements together, wherein the bonding between the binder film and the armor layer and the bonding between the armor layer and the jacket allows the optical transmission elements to be accessed via a single action that opens the jacket, the armor layer and the binder film.

13. The optical communication cable of claim 12 further comprising a first elongate member embedded in the jacket and a second elongate member embedded in the jacket, wherein the first elongate member and the second elongate member facilitate tearing of the jacket to assist accessing the plurality of optical transmission elements located within the channel.

14. The optical communication cable of claim 10 wherein an average thickness of the binder film is less than a fifth of an average thickness of the jacket.

15. The optical communication cable of claim 14 further comprising particles of water-blocking materials embedded in the binder film, wherein the extruded first material is a polyethylene material, wherein the extruded second material is at least one of a polyethylene material and a polypropylene material, and the armor layer is a corrugated metal material.

16. The optical communication cable of claim 10 wherein at least one of the plurality of optical transmission elements comprises an optical fiber surrounded by a buffer tube, wherein the binder film includes an inner surface, and the inner surface of the binder film directly contacts an outer surface of the buffer tube.

17. The optical communication cable of claim 10 wherein the binder film is bonded to the armor via a binding agent.

18. An optical communication cable comprising:
a support member;
a plurality of optical transmission elements wrapped around the support member;
a binder membrane surrounding the support member and continuous peripherally around the plurality of optical transmission elements to define a continuous closed loop when viewed in a cross-section perpendicular to a long axis of the plurality of optical transmission elements, wherein the binder film is continuous lengthwise for at least 10 meters along a length of the cable, and wherein the thickness of the binder membrane is less than a fifth of the thickness of the jacket;
armor having a first lateral edge and an opposing second lateral edge, the armor being wrapped around the support member, the plurality of optical transmission elements and the binder membrane such that the first lateral edge overlaps the second lateral edge creating an overlap portion; and
a jacket including an inner surface and an outer surface, the outer surface defining an exterior of the jacket and the inner surface defining a channel;
wherein the support member, the plurality of optical transmission elements, the binder membrane and the armor are located within the channel;
wherein the binder membrane acts to bind the plurality of optical transmission elements together around the support member; and
wherein the binder membrane is coupled to the armor and the armor is bonded to the jacket such that the binder membrane, the armor, and the jacket are configured to be opened together via a single tearing action.

19. The optical communication cable of claim 18 wherein the jacket includes a primary portion formed from a first extruded material and a secondary portion formed from a second extruded material embedded in the first extruded material, wherein the second extruded material is aligned in the radial direction with the overlapped portion of the armor.

20. The optical communication cable of claim 19 wherein the modulus of elasticity of the first extruded material is between 100 and 800 MPa and the modulus of elasticity of the second extruded material is no more than half that of the first material.

21. An optical communication cable comprising:
a jacket formed from an extruded first material and including an inner surface defining a channel;
a plurality of optical transmission elements located within the channel;
a binder film formed from an extruded second material different than the first material and including an outer surface, wherein the binder film is continuous peripherally around the plurality of optical transmission elements to define a continuous closed loop when viewed in a cross-section perpendicular to a long axis of the cable, wherein the binder film is continuous lengthwise for at least 10 meters along a length of the cable, and wherein a thickness of the binder film is less than a fifth of a thickness of the jacket; and
an armor layer located within the channel surrounding the plurality of optical transmission elements and the binder film, wherein the armor layer includes a first lateral edge and an opposing second lateral edge and the armor layer is wrapped around the plurality of optical transmission elements and the binder film such that the first lateral edge overlaps the second lateral edge creating an overlap portion, wherein the jacket includes an elongate portion formed from an extruded second material embedded in the extruded first material, the elongate portion being aligned in a radial direction with the overlap portion of the armor, and wherein the outer surface of the binder film is bonded to an inner surface of the armor layer and an outer surface of the armor layer is bonded to the inner surface of the jacket.

\* \* \* \* \*